United States Patent [19]

McGrath et al.

[11] Patent Number: 5,248,275
[45] Date of Patent: Sep. 28, 1993

[54] BALLOON WITH FLAT FILM VALVE AND METHOD OF MANUFACTURE

[75] Inventors: John McGrath; Dennis Cope, both of Castro Valley; Scott Harris, Mill Valley; Charles Becker, San Francisco, all of Calif.

[73] Assignee: M & D Balloons, Inc., Brisbane, Calif.

[21] Appl. No.: 702,790

[22] Filed: May 20, 1991

[51] Int. Cl.⁵ .............................................. A63H 27/10
[52] U.S. Cl. ........................... 446/224; 137/512.15; 137/846; 137/844
[58] Field of Search ............................ 446/224, 220; 137/512.15, 512.4, 846, 849, 844, 223; 206/522; 383/44, 49, 50, 51

[56] References Cited

U.S. PATENT DOCUMENTS

| | | |
|---|---|---|
| 1,625,394 | 4/1927 | Roberts . |
| 1,702,974 | 2/1929 | MacDonald . |
| 2,597,924 | 5/1952 | Davenport et al. ............... 2/267 |
| 2,700,980 | 2/1955 | Andrews ........................ 137/223 |
| 2,864,201 | 12/1958 | Leise . |
| 3,006,257 | 10/1961 | Orsini ........................... 93/35 |
| 3,149,017 | 9/1964 | Ehrreich et al. ................ 161/36 |
| 3,207,420 | 9/1965 | Navarrette-Kindelan ........ 229/56 |
| 3,230,663 | 1/1966 | Shabram . |
| 3,332,415 | 7/1967 | Ericson ..................... 446/224 X |
| 3,392,077 | 7/1968 | Brieske et al. ................. 156/253 |
| 3,664,058 | 5/1972 | Brieske . |
| 4,290,763 | 9/1981 | Hurst ............................ 493/341 |
| 4,674,532 | 6/1987 | Koyanagi .................. 137/512.15 |
| 4,708,167 | 11/1987 | Koyanagi .................. 137/512.15 |
| 4,758,198 | 7/1988 | Ishiwa .......................... 446/220 |
| 4,842,007 | 6/1989 | Kurtz ............................ 137/223 |
| 4,850,912 | 7/1989 | Koyanagi ...................... 441/40 |
| 4,917,646 | 4/1990 | Kieves ......................... 446/224 |
| 4,983,138 | 1/1991 | McGrath ...................... 446/224 |

FOREIGN PATENT DOCUMENTS 5211898 7/1974 Japan .

Primary Examiner—Mickey Yu
Attorney, Agent, or Firm—Fitch, Even, Tabin & Flannery

[57] ABSTRACT

A balloon includes a pair of overlying valve film strips disposed between a pair of overlying balloon films, which include neck and body portions. The valve film strips extend at an angle to a central axis of the neck portions, and valve seals formed in the valve film strips direct incoming gas from an inlet adjacent the neck, to an outlet between the body portions. Methods of assembling the balloons by forming the valve seams and neck seams without moving the balloon films or valve film strips is also disclosed.

54 Claims, 5 Drawing Sheets

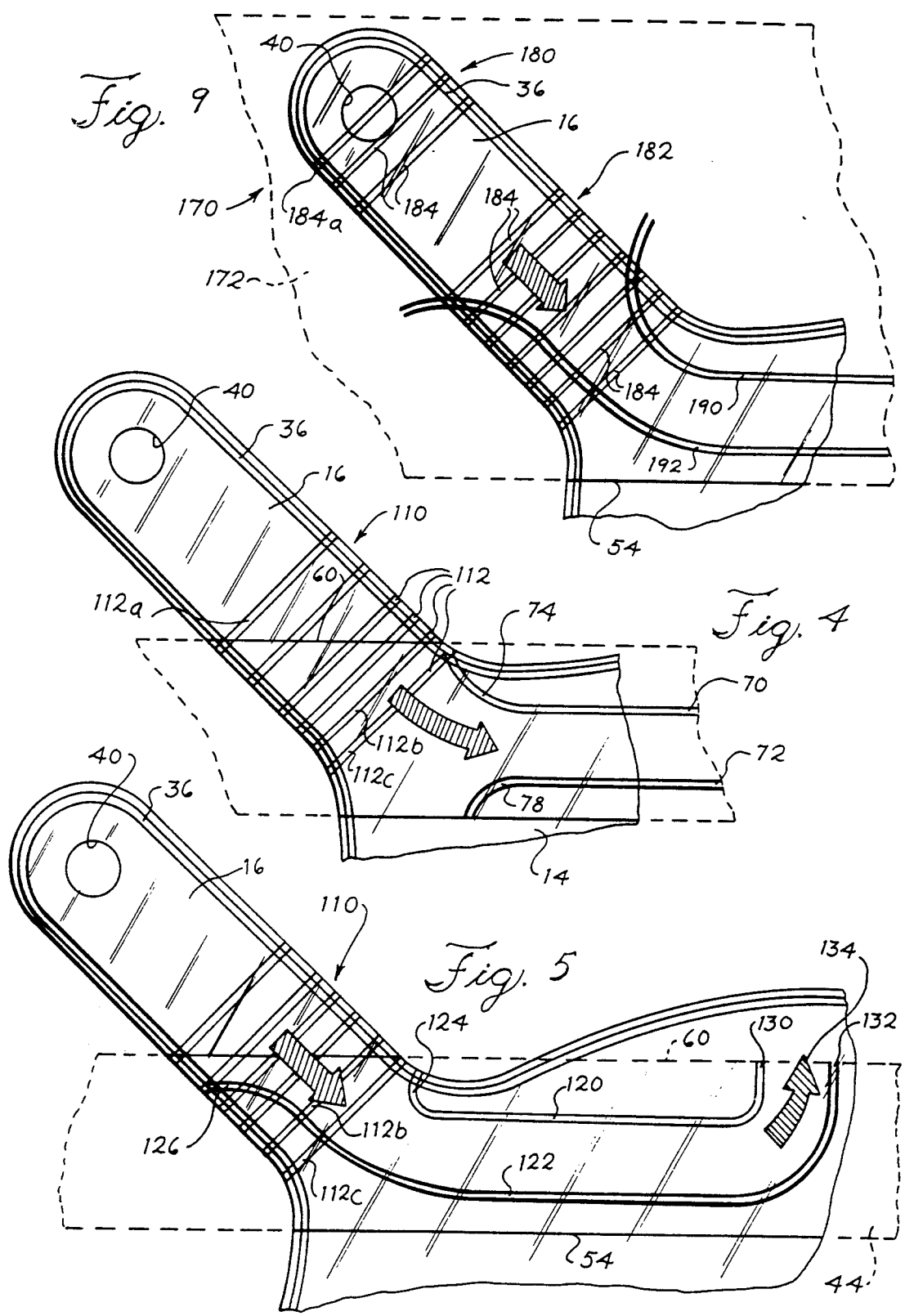

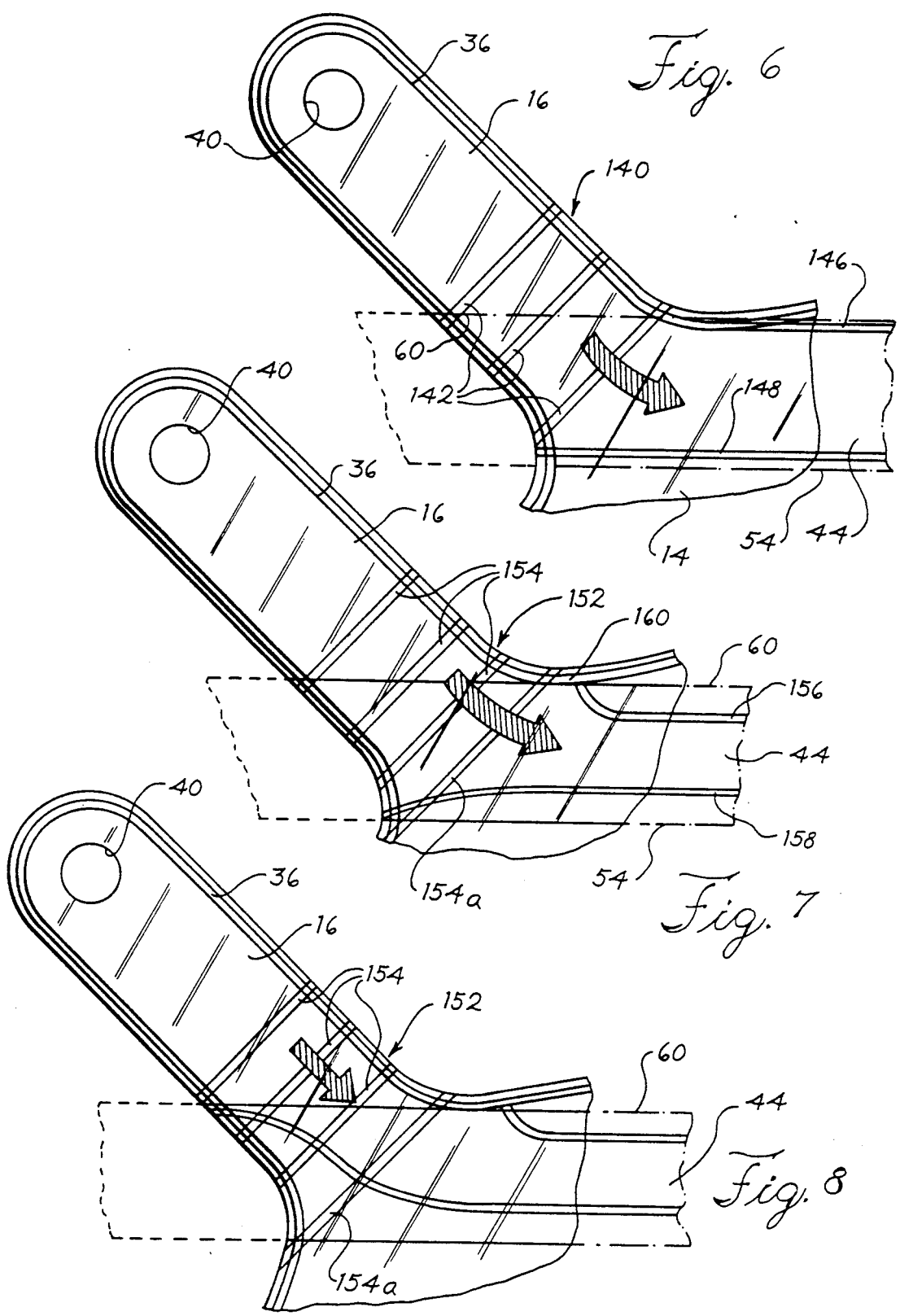

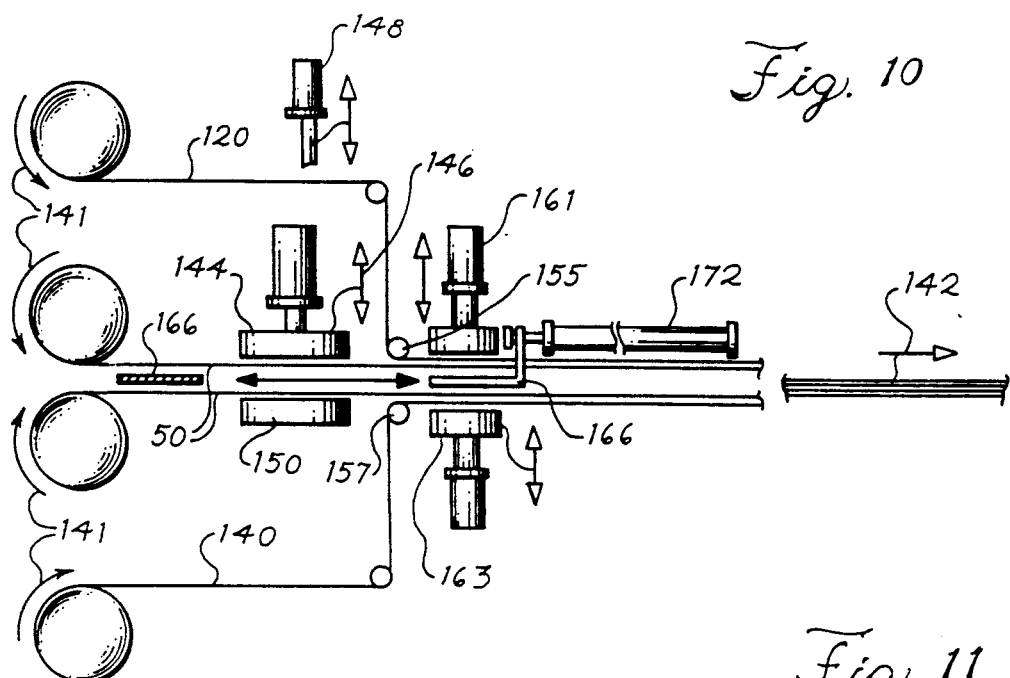
Fig. 10
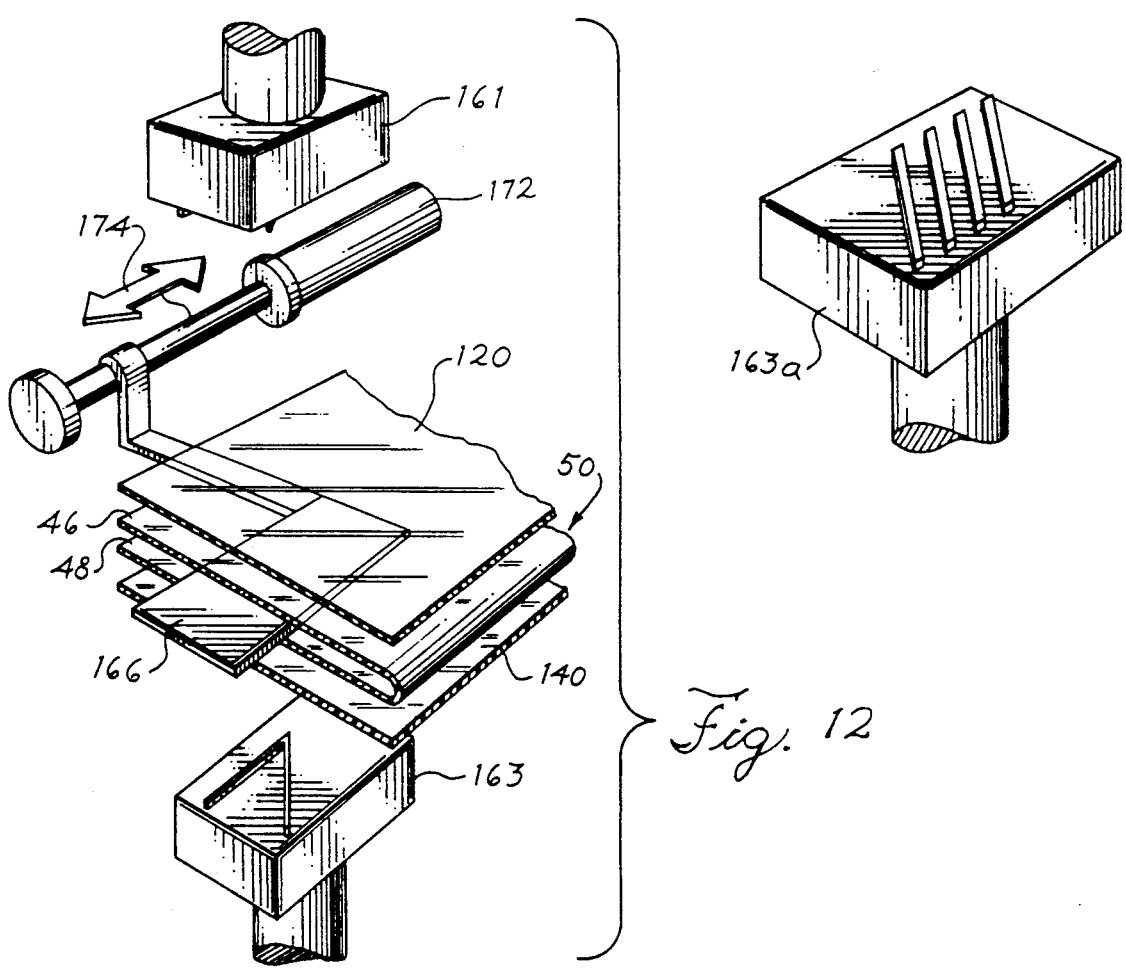
Fig. 11
Fig. 12

BALLOON WITH FLAT FILM VALVE AND METHOD OF MANUFACTURE

BACKGROUND OF THE INVENTION

1. Field of the Invention

The present invention pertains to balloons having internal valves and in particular to flat film valves.

2. Description of the Related Art

Improvements have been sought in the field of toy balloon manufacture, and in particular toy balloons having internal flat film valves such as that disclosed in U.S. Pat. No. 4,917,646. In that patent, a premade valve is positioned on a layer of film which will become the outer wall of a completed balloon assembly. The premade valve is provided with a positioning tab, and this tab is heat sealed to the layer of balloon film. Next, the balloon film and the valve film sealed thereto are advanced to a subsequent work-station where a second balloon film is overlaid on the partial assembly and the balloon films are sealed to each other and to the valve. In order to prevent closure of the valve, the premade valve must be provided with a layer of heat-resistant ink, at those portions of the valve where heat sealing to the balloon films is performed. As those skilled in the art will appreciate, advancing of the subassembly from one position to another prior to registration of the final balloon components complicates the remaining construction steps needed to complete the balloon assembly, moving the production process, and requiring increased attention to the design, operation and maintenance of equipment used in the automated manufacture, in an effort to maintain exacting manufacturing tolerances.

Despite these extra efforts, difficulties in maintaining high levels of reliability in processes of the type disclosed in U.S. Pat. No. 4,917,646 have been known to occur. Such difficulties have been observed in valve entrance openings internal to a completed balloon assembly, leaking valves, and valves with impaired openings which are more difficult for a reseller to fill. Further some resellers prefer to heat seal even self-sealing balloons once filled, as a matter of policy, despite the proven reliability of self-sealing valves to automatically close when the balloon is inflated. Such policies may be employed, for example, where a reseller receives balloons from a variety of different, sometimes unknown sources or when personnel inexperienced with balloon manufacture are employed in a flower shop or novelty shop, for example.

SUMMARY OF THE INVENTION

It is an object according to the present invention to provide a self-sealing balloon of the type having an internal flat film valve.

Another object according to the present invention is to provide a balloon of improved design which simplifies the balloon assembly, and which permits the use of less costly construction techniques. In particular, it is an object according to the present invention to provide a method of balloon assembly which requires less exacting assembly steps, including eliminating the need for registration of the balloon components.

A further object according to the present invention is to provide a method of balloon manufacture which does not require preassembly of the balloon components, including the valve, for example.

A further object according to the present invention is to provide a balloon which does not employ a heat-resistant coating, particularly adjacent the valve inlet.

Yet another object according to the present invention is to provide a balloon having a flat film valve formed from elongated strips of film material, so that entrance and exit portions of the valve can be located along the elongated edges of the valve films, without the need for exacting tolerances in the balloon manufacture.

A further object according to the present invention is to provide a method of balloon manufacture having heat-sealing steps which can be carried out in a more flexible manner and in which the order of the sealing steps can be altered as required.

These and other objects according to the present invention which will become apparent from studying the appended description and drawings are provided in a balloon apparatus comprising:

a pair of overlying balloon films having neck and body portions and peripheral edges, with the neck portions extending from the body portions along a neck axis, the peripheral edges of the neck and body portions joined together by peripheral seam means to form a pressure vessel with corners in the peripheral seam means at the juncture of the neck and body portions;

an elongate valve member between the balloon films, comprising a pair of overlying valve film strips having first and second generally opposed elongate side edges extending at an angle to the neck axis, from the peripheral seam means adjacent the neck portions into the body portions, with at least one side edge extending between both neck and body portions of said balloon films;

double-ended valve seas means joining said valve film strips together so an to form a passageway therebetween with an entrance opening at said at least one side edge, said valve seam means further having a first end adjacent said peripheral seam means and said neck portion and a second end between the body portions forming an exit opening; and neck seal means extending across said neck portions, joining the balloon film neck portions to adjacent valve film strips such that the passageway between the valve film strips remains open.

In other embodiments of the present invention, both the valve entrance and valve exit are located along elongated edges of the valve.

Other objects according to the present invention are attained in a method of balloon manufacture comprising the steps of a method of making a balloon apparatus comprising the steps of:

providing two balloon films, one overlying the other;
spacing the balloon films apart from one another;
providing two double-ended, elongated valve films, one overlying the other;
inserting the valve films between the balloon films;
sealing one end of each balloon film to a valve film immediately adjacent thereto;
sealing remaining portions of the valve films together to form a passageway with an opening;
sealing the balloon films together at the perimeters thereof to form a pressure vessel with an internal passageway therein.

BRIEF DESCRIPTION OF THE DRAWINGS

FIGS. 4-9 are fragmentary plan views of alternative embodiments of balloon assemblies illustrating aspects of the present invention;

FIG. 10 is diagrammatic elevational view illustrating one method of assembly according to principles of the present invention;

FIG. 11 is a perspective view of a tool die of a type used to fabricate the neck seal illustrated in FIG. 7;

FIG. 12 is a perspective view of a portion of the apparatus illustrated in FIG. 10, used to fabricate a neck seal of the type illustrated in FIG. 1;

DETAILED DESCRIPTION OF THE PREFERRED EMBODIMENTS

Figure 1:
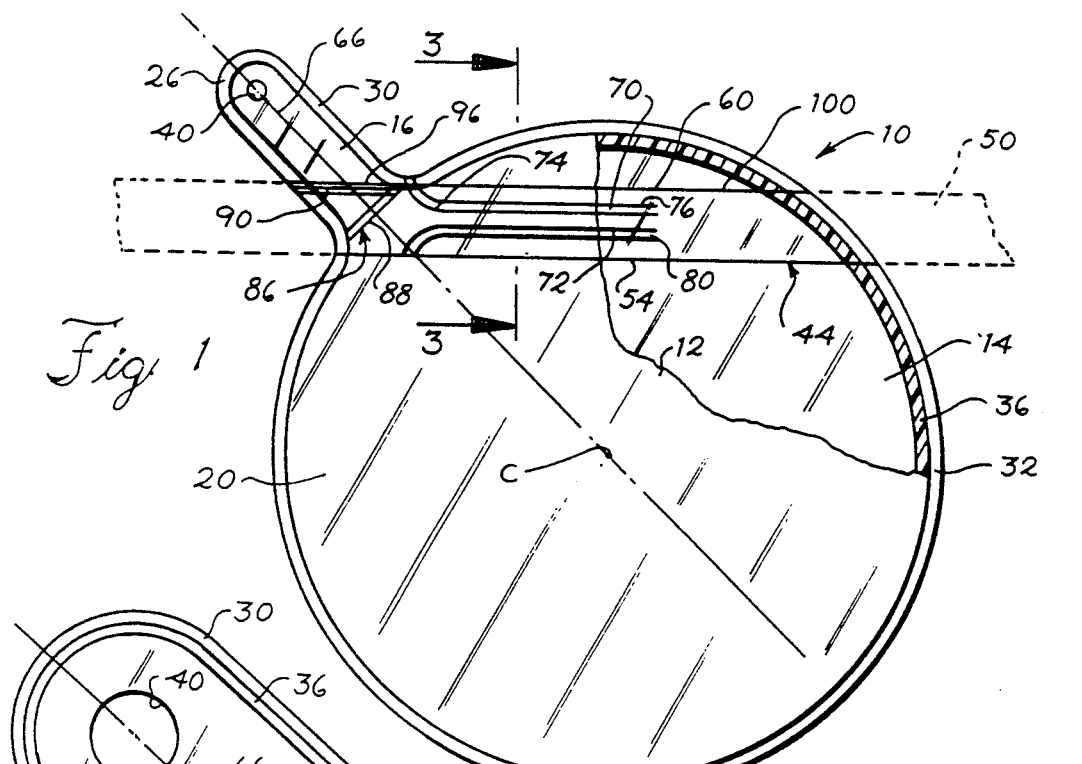
FIG. 1 is a plan view of a balloon assembly according to principles of the present invention.

Referring now to the drawings, and initially to FIG. 1, a balloon assembly is generally indicated at 10. The balloon assembly 10 includes a pair of overlying balloon films 12, 14 having neck portions 16 and body portions 20. In the preferred embodiment, the neck portions are of a generally rectangular elongated configuration with rounded ends 26 and opposed ends adjacent the generally circular body portions. The neck and body portions have peripheral edges 30, 32, respectively which are blended together to form a continuous outline of the finished balloon. The neck and body portions are joined together by a peripheral seam 36 which follows the peripheral edges 30, 32.

In the preferred embodiment, the neck and body portions of each balloon film comprise parts of an integral, one-piece film formed from a webbing of suitable material, such as MYLAR, and the seam 36 is formed using conventional techniques, preferably, by heat sealing the balloon films together. The die used for the heat sealing has the outline of the overall balloon films visible in FIG. 1 and includes an outer cutting portion which cuts the balloon films out of the webbing of balloon film material, so as to have the peripheral configuration illustrated in FIG. 1. These aspects of balloon manufacture are known in the art, and will not be described further herein.

Figure 2:
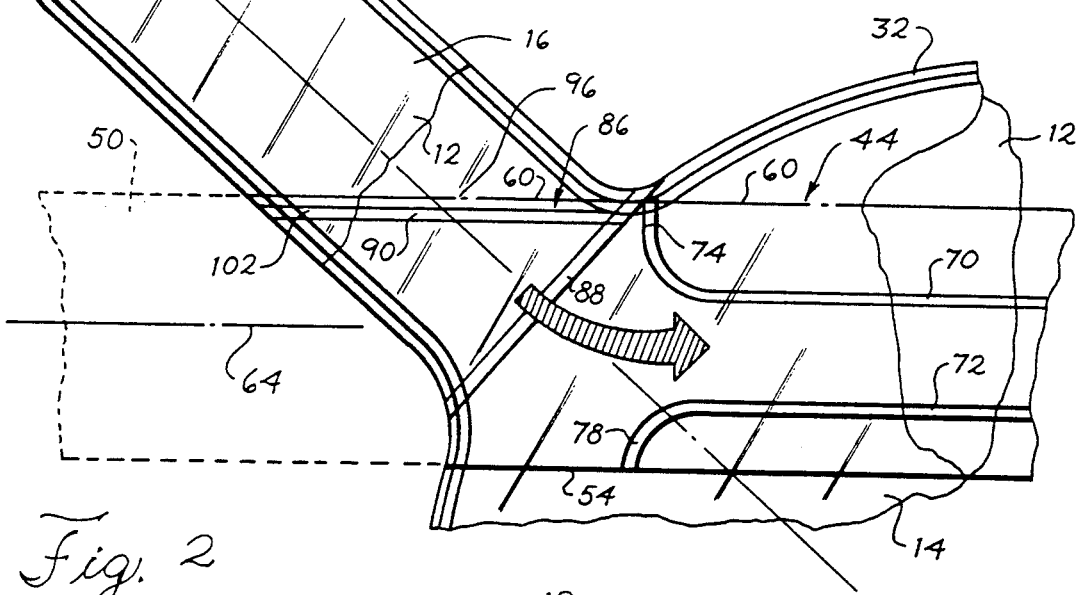
FIG. 2 is a fragmentary view of FIG. 1 shown on an enlarged scale.
Figure 3:
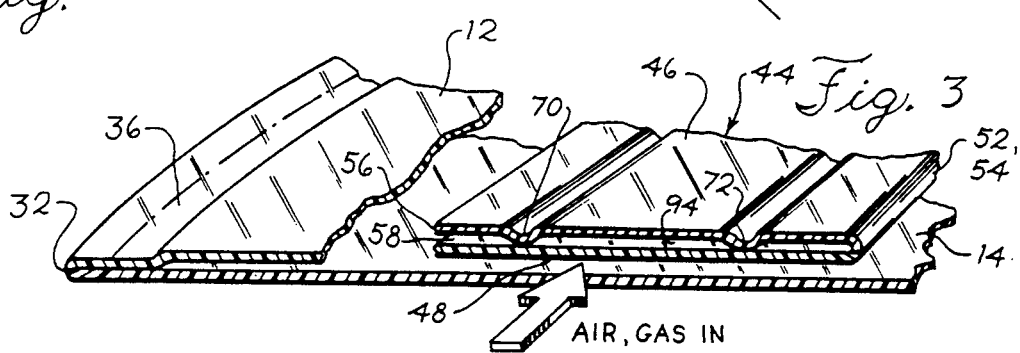
FIG. 3 is a fragmentary perspective cross-sectional view taken along the line 3—3 of FIG. 1.

The upper balloon film 12 has a circular opening 40 formed therein so that an inflating gas can be injected between the neck portions of the balloon films, to expand the body portions of the balloon films, to thereby inflate the balloon in a known manner. According to one aspect of the present invention, the balloon assembly 10 includes an improved self-sealing flat film valve. With additional reference to FIGS. 2 and 3, the valve is generally indicated at 44, and preferably has an elongated, generally rectangular configuration. The valve is comprised of a pair of overlying valve film strips 46, 48 formed from a webbing of valve film material indicated at 50, as illustrated in FIGS. 1 and 2. In the preferred embodiment, the overlying valve film strips 46, 48 are preferably formed from a single sheet of valve film material folded in half, lengthwise, along a fold line so as to form a first side edge 54, that folded edge located adjacent the center of the balloon body portions. If desired, however, the valve film strips 46, 48 can be formed from separate portions of valve film webbing generally coterminous with one another, and overlying one another, being aligned in registry. The valve film strips 46, 48 have free edges 56, 58 at the second side edge 60 of the valve, that edge remote from the center of the balloon film body portions. The portions of webbing 50, illustrated in FIGS. 1 and 2 in phantom, are those portions of the webbing lying outside of the balloon edges and which are trimmed away, along with the webbing of balloon films 12, 14. The phantom portions are illustrated to aid in understanding the construction of the balloon assembly and the method of construction to be explained herein. The webbing from which balloon films 12, 14 are formed have edges parallel to the edges of webbing 50 and which extend the full height of the balloon films of FIG. 1 so that each balloon film can be formed as a separate unbroken piece from the film webbing.

Referring now to FIG. 2, valve 44 has a longitudinal center line or axis 64, extending in a generally horizontal direction in FIG. 2. The neck portions of the balloon films have a longitudinal center line axis 66 extending at an acute angle to the valve axis 64. According to one aspect of the present invention, the second side edge 60 of the valve film extends at an angle to the neck axis 66. Referring again to FIG. 1, the neck axis 66 of the preferred embodiment passes through the center C of the balloon film body portions, although such is not required by the present invention. It is also preferred that the valve be disposed between the neck of the balloon assembly and the center C of the balloon film body portions. As will be appreciated by those skilled in the art, the orientation of the valve film edge 60, at an angle to the neck axis 66, allows manufacturing tolerances to be relaxed, thereby resulting in economies of manufacture.

The valve film strips 46, 48 are joined together along valve seals 70, 72. The valve seal 70 has a first end 74 extending from seam 36, adjacent the neck portion 16, and a free and 76 positioned between the balloon film body portions, at a point spaced from the seam 36. The second valve seal 72 has a first end 78 extending from the folded side 54, and a second end 80 positioned adjacent the valve seal end 76, between balloon films 12, 14, and spaced from the peripheral seam 36.

A generally V-shaped neck seal arrangement 86 comprises a first seal 88 which crosses the neck axis 66, generally at the juncture of the neck and body portions of the balloon films. The neck seal 88 in the embodiment of FIGS. 1-3 crosses the neck axis at a generally right angle, although such is not required and crossing at other angles are possible. The neck seal arrangement 86 further includes a second neck seal 90 which extends adjacent the valve side edge 60. It is generally preferred that the neck seal 90 be positioned as close to the valve side edge 60 as possible, but according to one advantage of the present invention, the neck seal 90 can be spaced at small distances from the side edge 60, without impairing inflation of the balloon assembly. The neck seals 88, 90 do not extend through the four layers of the balloon assembly. Rather, a pair of neck seals 88, 90 are employed. The first neck seals 88, 90 join the upper valve film strip 46 to the upper balloon film 12, and a separate, second set of neck seals 88, 90 joins the lower valve film strip 48 to the lower balloon film 14. Thus, a gap 94 between the valve film strips 46, 48 (see FIG. 3) is maintained throughout the length of valve 44, beginning at the valve inlet 96, located at that portion of the side edge 60 lying within the neck portion of the balloon assembly. Preferably, the neck seals 88, 90 extend to the peripheral seam 36, or at a point immediately adjacent thereto, to prevent air leakage past the neck seal arrangement. It is important that gas entering the valve inlet 96 does not force the free edge 60 of the valve films together, so an to close off or reduce the valve inlet opening. Heretofore, great care has been taken to insure that the neck seals of a balloon were properly spaced with respect to the balloon film edges, with a high degree of accuracy. With the present invention, economies of manufacture are possible because the accuracy of the neck seal placement can be relaxed to some extent. This is made possible by the valve film edge at the valve inlet, passing at an angle to the neck axis.

Referring to FIGS. 1 and 2, the valve seals 70, 72 define a path for incoming gas, directing the gas between the body portions of the balloon films. As mentioned, in the preferred embodiment, the first edge 54 of the valve is closed and comprises a fold line in the valve film web, dividing the web into first and second valve film strips 46, 48. The valve seal 80 has a rounded end 78 originating at the edge 54. The valve seal 70 has a rounded edge 74 originating at peripheral seam 36, the rounded ends 74, 78 being located adjacent the juncture of the balloon film neck and body portions. The valve seals form a continuous channel from a point adjacent the neck portion, to a point interior of the balloon film body portions. Incoming gas emerging from the ends 76, 80 of the valve seal 70, 72 is confined by the edge 54 of the valve films and portions of the peripheral seas 36 located at the right-hand end of the valve 44. The valve edge 60 is open, and incoming gas enters between the balloon film body portions through the valve outlet 100, that portion of valve edge 60 lying between the free ends 76, 80 of the valve seals 70, 72 and that portion of the peripheral seam 36 which seals the ends of the valve film strips which are remote from the neck. As mentioned, the valve film strips 46, 48 could be separately formed, with the edge 54 being open. In this alternative embodiment, the valve outlet would further include that portion of edge 54 lying between the free ends 76, 80 of the valve seals 70, 72 and the peripheral seam 36.

As will now be appreciated, the ends of the valve seals, especially the upstream ends 74, 78 need not be precisely located at a particular point with respect to the balloon films 12, 14. Thus, with the present invention, neither the valve seals nor the neck seals must be located with a high degree of accuracy. It is important, however, that the neck seal 90 be located close enough to edge 60 of the valve lying in the neck portion so as to prevent portions of the edge 60 lying to one side of the valve seal from closing together when gas is injected through opening 40.

The neck seal 90 has a free end 102 which extends to peripheral seam 36, to prevent gas leakage at that end of the valve inlet. The remainder of the neck seal 90 should be located at or adjacent the edge 60 to protect the valve inlet against collapse. The opposite end of the neck seal 90, that and located at the crotch of the "V", preferably intersects the peripheral seam 36, or is located immediately adjacent thereto. However, if valve seal 88 extends to edge 60 of the valve film, at a point immediately adjacent the peripheral edge 36, the end of the neck seal 90 adjacent the crotch of the "V" could be spaced from the peripheral seam 36, since the neck seal would operate to prevent gas leakage at the crotch of the V-shaped neck seal arrangement.

If the edge 54 of the valve is closed in the folded valve film embodiment, the valve seal 72 could be eliminated if desired. However, in the preferred embodiment, the valve seal 72 in added to form a valve passageway of dimensions set by the tool die, thereby adding to the accuracy and precision throughout multiple production runs. If the valve is formed from a single folded sheet, the valve seal 72 may be omitted if desired. However, certain advantages can be obtained by providing a pair of valve scales, even if one side of the valve is closed, as in the preferred embodiment. For example, with the addition of valve seal 72, the valve seals could include undulating configurations, rather than the straight-line configurations illustrated in FIGS. 1-3, to provide a valved passageway defined by serpentine seals. As mentioned above, the locations of the free ends of the valve seals are not particularly critical to a successful performance of the balloon assembly, and an additional flexibility in manufacturing is also possible since the shape of the valve seals is not particularly critical to provide a self-sealing, flexible film valve meeting minimum requirements.

Turning now to FIG. 4, an alternative embodiment of a valve seal arrangement is generally indicated at 110. The valve seal arrangement 110 is comprised of a plurality of generally parallel straight seals 112 extending across neck portions 16,, and preferably at generally right angles to the neck axis. The seals 112a and 112b are located adjacent portions of edge 60 which intersect the peripheral Bean 36. A plurality of intervening seals support intermediate portions of edge 60 against collapse at the valve inlet. The seal 112c is optional, and is provided in FIG. 4 to join the curved end 74 of valve seal 70 to a point on the balloon films at least immediately adjacent to peripheral seam 36. The remaining aspects of the balloon assembly of FIGS. 1-3 remain unchanged.

Referring now to FIG. 5, an alternative embodiment of the valve seals in shown. Valve seals 120, 122 have upstream ends 124, 126, respectively, adjacent the neck portion of the balloon and opposed outlet ends 130, 132, respectively, at the edge 60 of the valve. A valve outlet 134 is thereby formed at the edge 60, between the ends 130, 132 of the valve seal. As mentioned above, the upstream ends of the valve seals need not intersect a seal of the neck seal arrangement at the peripheral seam of the balloon. As can be seen in FIG. 5, the upstream end 124 of the valve seal 120 is spaced from the nearest neck seal 112c. As a further alternative arrangement, as illustrated in FIG. 5, the valve seals can extend into the neck portion of the balloon. For example, the valve seal 122 extends across four neck seals, and has an upstream end 126 remote from the juncture of the neck and body portions of the balloon.

Referring now to FIG. 6, a neck seal arrangement is generally indicated at 140 comprising three neck seals 142. As with the preceding neck seal arrangements, the portion of edge 60 lying in the neck has the end portions and at least one intermediate portion thereof secured with a neck seal. As a further alternative construction, the valve seals 146, 148 are of generally straight-line configuration throughout. Since the valve seal 148 extends to edge seam 36, the valve film strips could be opened at the side edge 54, if desired.

Turning now to FIG. 7, the valve film strips are of a narrower dimension, such that the "in-board" edge 54

(that edge closest to the center) of the balloon film body portion is located at the juncture of the neck and body portions of the balloon films. The opposite, outboard edge 60 lies just inside the edge seam 36 whereas in the embodiments of FIGS. 1–5, that edge was located outside of the balloon periphery, so as to extend outside of the finished balloon assembly between the neck and body portions thereof. The neck seal arrangement 152 includes neck seals 154. One and neck seal, 154a, is located in the juncture of the neck and body portions of the balloon, being located in the out-turned portions of the edge seas 36, beyond the parallel edges of the neck portion. The neck seal 154a provides a redundant sealing of the edge 60 of the valve films adding to the sealing provided at the slight overlap of valve film edge 60 with the edge seam 36, indicated at 160. Since the valve seal 158 extends to edge seam 36, adjacent the neck portion of the balloon assembly, the opposite edge 54 of the valve films could be left opened, if desired.

Turning now to FIG. 9, the valve 170 is formed from valve film strips 172 which are considerably wider than those of the preceding embodiments. As illustrated, the valve film strips 172 extend throughout the entire neck portion of the balloon. The neck seal arrangement is provided in two portions, generally indicated at 180 and 182, respectively. Each neck seal portion 180, 182 is comprised of neck seals 184 extending generally at right angles to the neck axis. The first neck seal portion 180 has seals securing the valve films and balloon films together, adjacent the entrance opening 40. The seal 184a visible in the opening 40 is the lower neck seal, joining the lower valve and balloon films.

The second portion of the neck seal arrangement, generally indicated at 182, is located in the neck portion of the films, adjacent the juncture of the neck and body portions of the balloon assembly. In addition to the neck seals 184, the valve and balloon films are joined at the edge seam 36, which provides support for the upstream portions of the valve passageway, beginning at the valve inlet located at opening 40. In the embodiment illustrated in FIG. 9, the valve seals 190, 192 extend into the neck portion of the balloon assembly, although the valve seals could be terminated adjacent the juncture of the neck and body portions of the balloon films. Unlike the preceding embodiments, the valve 170 must include provision for an exit opening. It is preferred, in that regard, to terminate the valve films shorter than that previously described in FIG. 1 at a point interior of the balloon film body portions, spaced from the peripheral edge 36, which termination point will function as the valve outlet.

Referring now to FIGS. 10–12, a first method of assembly of the balloon components will now be described. Four rolls of webbing are provided, with the two central rolls providing the webbing 56 for the valve film strips 46, 48 and the outer rolls providing webbing from which the balloon films are formed. For example, the upper webbing 120 is processed to form the upper balloon film 12, while the lower webbing 140 is processed to form the lower balloon film 14.

The various rolls of webbing are advanced in the direction indicated by the arrows 141 and the completed balloon assemblies are advanced in the direction indicated in arrow 142. Apparatus for manufacturing the balloon assembly includes a valve die 144 reciprocal in the vertical directions of arrow 146 by a connection to an actuator 148. The valve film strips 46, 48 are pressed against a support die 150, to form the valve seals 70, 72. In a preferred embodiment, the valve die 144 is heated to perform a heat-sealing operation to form the valve seal arrangements. Thus, the valve seal arrangement is formed between webbing for the balloon films. The webbing 120, 140 for the balloon films is guided over rollers 155, 157 so as to be closely spaced to the films 46, 48.

Apparatus for fabricating the balloon assembly further includes tool die members 161, 163 both of which are preferably moveable in vertical directions as indicated by the arrows in FIG. 10. The tool members 161, 163 are preferably heated so as to heat seal the balloon films and valve film strips together to form the neck seal arrangements as described above. It is important that the valve film strips 46, 48 are not welded shut by the neck seal arrangements, and accordingly a barrier member 166 in interposed between the valve film strips 46, 48 during forming of the valve seal arrangement. Since the preferred method of forming the neck seal arrangements employs a heat-sealing technique, the barrier 166 preferably comprises a thermal barrier made of suitable material such as TEFLON, for example.

In the preferred embodiment, the valve seals and neck seals are formed at substantially the same time, without movement of the film webbing. Thus, registration of the various seals is provided by aligning the die members 144, 150 and 161, 163 thus providing a significant economy of manufacture. If desired, the valve seals and neck seals could be made in sequence for a given balloon assembly, but in any event, neither the valve film strip nor the webbing for the balloon films need be moved.

The neck seals are formed first by bringing the die members 161, 163 together, and after the die members are separated, the barrier 166 is moved to the upstream position indicated in FIG. 10, adjacent the rolls providing a source of valve film strip material. Thereafter, the die member 144 is lowered against support 150 to form the neck seal arrangement. The four sheets of webbing are then advanced in the direction of arrow 142, being stored for future processing, or more preferably, being passed to a subsequent work station which forms the edge seam 36 and cuts the outer periphery of the balloon and valve film strips from their respective webbings.

With additional reference to FIG. 12, the barrier 166 is advanced between the positions illustrated in FIG. 10, by a pneumatically operated cylinder 172 which is extended and retracted in the direction of arrow 174. As can be seen at the bottom of FIG. 12, the die member 163 is provided with the V-shaped configuration of the neck seals of FIGS. 1 and 2. FIG. 11 shows an alternative embodiment 163a of the die member for forming neck seals illustrated in FIGS. 7 and 8.

Figure 13:
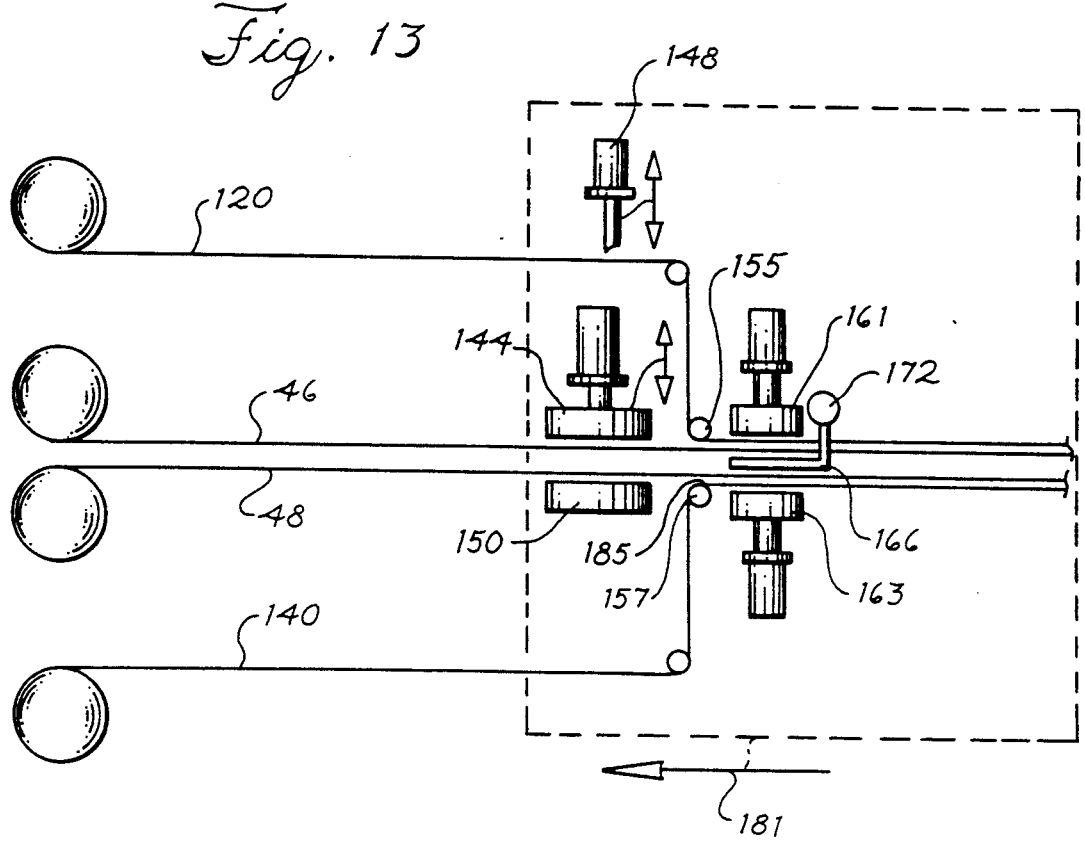
FIG. 13 is a schematic elevational view of an alternative assembly method with balloon making equipment illustrated in a first position.
Figure 14:
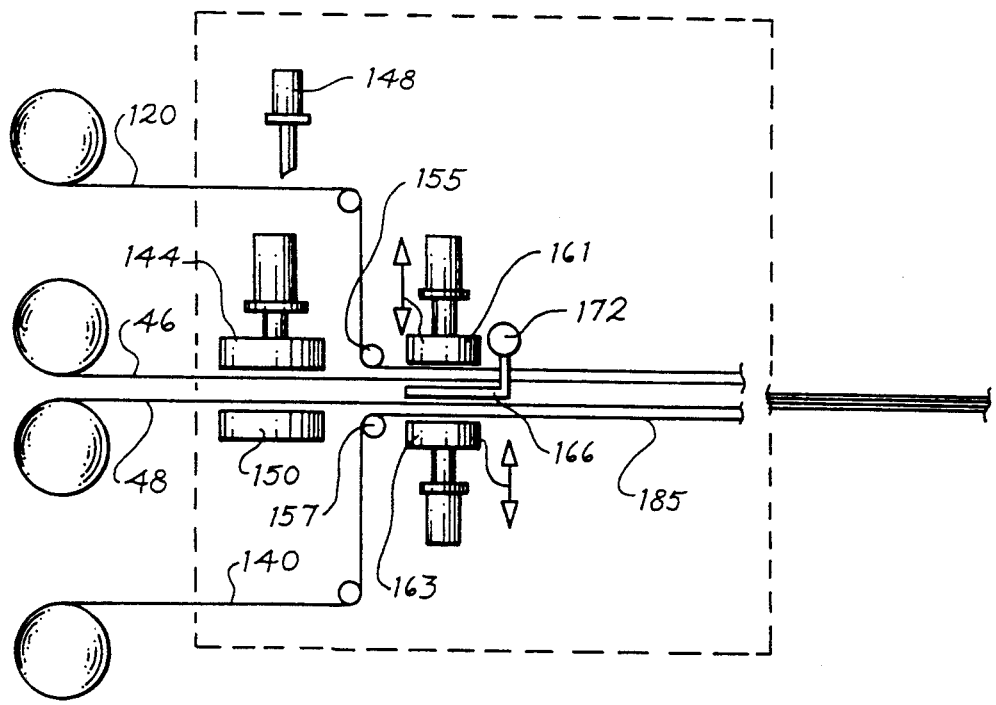
FIG. 14 is a view similar to FIG. 13, but showing the balloon-making equipment moved to a second position, with ends of the balloon films being held stationary.

As can be seen from the above, the various die members for forming the neck and valve seals are held in a stationary position and the webbing for the valve and balloon strips is moved past the die members. Turning now to FIGS. 13 and 14, an alternative method of construction of the balloon assembly will be described. The balloon assembly illustrated in FIG. 1 has a neck portion trailing behind the body portion, assuming web movement in the right-hand direction of FIG. 1. A balloon assembly with this orientation is fabricated using the method steps illustrated in FIGS. 13 and 14. In this alternative embodiment of the construction method according to principles of the present invention, the apparatus used to form the balloon assembly is mounted to a common frame for movement in the direction of arrow 181, to the position illustrated in FIG. 14. As with the preceding method, the webbing for the various balloon films and valve film strips in held stationary during the neck seal and valve seal steps.

Referring to FIG. 13, the die member 144 is operated to form the valve seal in valve strips 46, 48. For reference purposes, a numeral 185 is applied to a portion of webbing 140 in contact with guide roller 157. After the valve seals are formed, the apparatus enclosed within the phantom line is moved in a direction of arrow 181 to the position illustrated in FIG. 14, where the die members 161, 163 are operated to form the neck seal. For reference purposes, the reference point 185 of the webbing 140 is indicated in FIG. 14, to the right of die member 162. As the guide rollers 155, 157 travel in the direction of arrow 181, the previously expanded portions of the outer webbing 120, 140 are pressed together, in preparation for the neck sealing steps. In order to allow passage of the barrier 166 past the valve seal, the orientation of the pneumatic cylinder 172 is displaced 90°, so that its direction of actuation is in a direction into and out of the plane of the paper on which FIGS. 13 and 14 are drawn. After completing the neck seal step in FIG. 14, the balloon webbing is then advanced in a downstream direction in the right-hand direction, where the edge seam 36 is formed and the outer periphery of the balloon films and valve films is cut free from their respective webbing members.

The drawings and the foregoing descriptions are not intended to represent the only forms of the invention in regard to the details of its construction and manner of operation. Changes in form and in the proportion of parts, as well as the substitution of equivalents, are contemplated as circumstances may suggest or render expedient; and although specific terms have been employed, they are intended in a generic and descriptive sense only and not for the purposes of limitation, the scope of the invention being delineated by the following claims.

What is claimed is:

1. Balloon apparatus, comprising:
   a pair of overlying balloon films having neck and body portions and peripheral edges, with the neck portions extending from the body portions along a neck axis, the peripheral edges of the neck and body portions joined together by peripheral seam means to form a pressure vessel with corners in the peripheral seam means at the juncture of the neck and body portions;
   an elongate valve member between the balloon films, comprising a pair of overlying valve film strips having first and second generally opposed elongate side edges extending at an angle to the neck axis, from the peripheral seam means adjacent the neck portions into the body portions, with at least one side edge extending between both neck and body portions of said balloon films;
   double ended valve seam means joining said valve film strips together so as to form a passageway therebetween with an entrance opening at said at least one side edge, said valve seam means further having a first end adjacent said peripheral seam means and said neck portion and a second end between the body portions forming an exit opening; and
   neck seal means extending across said neck portions, joining the balloon film neck portions to adjacent valve film strips such that the passageway between the valve film strips remains open.

2. The apparatus of claim 1 wherein said valve seam means comprises a plurality of spaced-apart seams, at least one of which is joined to said peripheral seam means.

3. The apparatus of claim 1 wherein said balloon film body portions have a center and said valve member is spaced from said center.

4. The apparatus of claim 3 wherein said neck axis extends generally through said center.

5. The apparatus of claim 1 wherein portions of said valve film strips at the entrance opening are in direct contact with one another when pressed together without an intervening barrier applied to the valve films.

6. The apparatus of claim 1 wherein the valve film strips comprise folded portions of a single, one-piece integral film strip, folded along a fold line so as to overlie one another, said fold line comprising one of said valve film side edges.

7. The apparatus of claim 6 wherein said valve seam means comprises a valve seam spaced from the fold line and joined at one end to said peripheral seam means.

8. The apparatus of claim 1 wherein said valve seam means comprises a pair of spaced, double-ended valve seams with one end of at least one of the valve seams extending to said peripheral seam means.

9. The apparatus of claim 1 wherein said neck seal means has a generally V-shaped configuration, with one leg of the V crossing the neck axis and the other leg of the V extending adjacent said at least one valve film edge.

10. The apparatus of claim 9 wherein the other leg of the V is located adjacent the entrance opening of the passageway.

11. The apparatus of claim 1 wherein said neck seal means comprises a plurality of spaced, generally parallel neck seams crossing the neck axis.

12. The apparatus of claim 1 wherein said neck seal means comprises at least one neck seam extending across the film strips to side edges thereof.

13. The apparatus of claim 1 wherein the at least one side edge of the valve film strips is interrupted by the corner of the peripheral seam means.

14. The apparatus of claim 1 wherein the at least one side edge of the valve film strips extends through the corner of the peripheral seam means.

15. The apparatus of claim 1 wherein the at least one side edge of the valve film strips is spaced from the corner of the peripheral seam means.

16. Balloon apparatus, comprising:
   a pair of overlying balloon films having neck and body portions and peripheral edges, with the neck portions extending from the body portions along a neck axis, the peripheral edges of the neck and body portions joined together by peripheral seam means to form a pressure vessel with corners in the peripheral seam means at the juncture of the neck and body portions;
   an elongate valve member between the balloon films, comprising a pair of overlying valve film strips having a first side edge facing toward a central portion of the balloon and a second side edge facing away from the central portion of the balloon, with at least the second side edge extending between the neck and body portions at an angle to the neck axis;

double ended valve seam means joining said valve film strips together so as to form a passageway therebetween with an entrance opening at said second side edge, said valve seam means further having a first end adjacent said peripheral seam means and said neck portion and a second end between the body portions forming an exit opening; and neck seal means extending across said neck portions, joining the balloon film neck portions to adjacent valve film strips such that the passageway between the valve film strips remains open.

17. The apparatus of claim 16 wherein said valve seam means comprises a plurality of spaced-apart seams, at least one of which is joined to said peripheral seam means.

18. The apparatus of claim 16 wherein said balloon film body portions have a center and said valve member is spaced from said center.

19. The apparatus of claim 18 wherein said neck axis extends generally through said center.

20. The apparatus of claim 16 wherein portions of said valve film strips at the entrance opening are in direct contact with one another when pressed together without an intervening barrier applied to the valve films.

21. The apparatus of claim 16 wherein the valve film strips comprise folded portions of a single-piece integral film strip, folded along a fold line so as to overlie one another, said fold line comprising said first valve film strip side edge.

22. The apparatus of claim 21 wherein said valve seam means comprises a valve seam spaced from the fold line and joined at one end to said peripheral seam means.

23. The apparatus of claim 16 wherein said valve seam means comprises a pair of spaced, double-ended valve seams with one end of at least one of the valve seams extending to said peripheral seam means.

24. The apparatus of claim 16 wherein said neck seal means has a generally V-shaped configuration, with one leg of the V crossing the neck axis and the other leg of the V extending adjacent said at least one valve film edge.

25. The apparatus of claim 24 wherein the other leg of the V is located adjacent the entrance opening of the passageway.

26. The apparatus of claim 16 wherein said neck seal means comprises at least one neck seam extending across the film strips to side edges thereof.

27. The apparatus of claim 16 wherein said neck seal means comprises a plurality of spaced, generally parallel neck seams crossing the neck axis.

28. The apparatus of claim 16 wherein the at least one side edge of the valve film strips is interrupted by the corner of the peripheral seam means.

29. The apparatus of claim 16 wherein the at least one side edge of the valve film strips extends through the corner of the peripheral seam means.

30. The apparatus of claim 16 wherein the at least one side edge of the valve film strips is spaced from the corner of the peripheral seam means.

31. Balloon apparatus, comprising:
a pair of overlying balloon films having neck and body portions and peripheral edges, with the neck portions extending from the body portions along a neck axis, the peripheral edges of the neck and body portions joined together by peripheral seam means to form a pressure vessel with corners in the peripheral seam means at the juncture of the neck and body portions;

an elongate valve member between the balloon films, comprising a pair of overlying valve film strips having first and second aid e edges facing toward and away from a central portion of the balloon, respectively, with at least the second side edge extending at an angle to the neck axis, the valve films joined together at the first side edges;

double ended valve seam means joining said valve film strips together so as to form a passageway therebetween with an entrance opening at said second side edge, said valve seas means further having a first end adjacent said peripheral seas means and said neck portion and a second end between the body portions forming an exit opening; and neck seal means extending across said neck portions, joining the balloon film neck portions to adjacent valve film strips such that the passageway between the valve film strips remains open.

32. The apparatus of claim 31 wherein said valve seam means comprises a plurality of spaced-apart seams, at least one of which is joined to said peripheral seam means.

33. The apparatus of claim 31 wherein said balloon film body portions have a center and said valve member is spaced from said center.

34. The apparatus of claim 33 wherein said neck axis extends generally through said center.

35. The apparatus of claim 31 wherein portions of said valve film strips at the entrance opening are in direct contact with one another when pressed together without an intervening barrier applied to the valve films.

36. The apparatus of claim 31 wherein said valve seam means comprises a pair of spaced, double-ended valve seams with one end of at least one of the valve seams extending to said peripheral seam means.

37. The apparatus of claim 31 wherein said neck seal means has a generally V-shaped configuration, with one leg of the V crossing the neck axis and the other leg of the V extending adjacent said at least one valve film edge.

38. The apparatus of claim 31 wherein at least one side edge of the valve film strips extends through the corner of the peripheral seam means.

39. The apparatus of claim 31 wherein the at least one side edge of the valve film strips is spaced from the corner of the peripheral seam means.

40. Balloon apparatus, comprising:
a pair of overlying balloon films having neck and body portions and peripheral edges, with the neck portions extending from the body portions along a neck axis, the peripheral edges of the neck and body portions joined together by peripheral seam means to form a pressure vessel with corners in the peripheral seam means at the juncture of the neck and body portions;

an elongate valve member between the balloon films, comprising a pair of overlying valve film strips having first and second generally opposed elongate side edges extending at an angle to the neck axis, from the peripheral seam means adjacent the neck portions into the body portions;

double ended valve seam means joining said valve film strips together so as to form a passageway therebetween with entrance and exit openings formed in at least one of said side edges; and neck seal means extending across said neck portions, joining the balloon film neck portions to adjacent valve film strips such that the passageway between the valve film strips remains open.

41. The apparatus of claim 40 wherein said valve seam means comprises a plurality of spaced-apart seams, at least one of which is joined to said peripheral seam means.

42. The apparatus of claim 40 wherein said balloon film body portions have a center and said valve member is spaced from said center.

43. The apparatus of claim 40 wherein said neck axis extends generally through said center.

44. The apparatus of claim 40 wherein portions of said valve film strips at the entrance opening are in direct contact with one another when pressed together without an intervening barrier applied to the valve films.

45. The apparatus of claim 40 wherein the valve film strips comprise folded portions of a single-piece integral film strip, folded along a fold line so as to overlie one another, said fold line comprising one of said valve film side edges.

46. The apparatus of claim 40 wherein said valve seam means comprises a valve seam spaced from the fold line and joined at one end to said peripheral seam means.

47. The apparatus of claim 40 wherein said valve seam means comprises a pair of spaced, double-ended valve seams with one end of at least one of the valve seams extending to said peripheral seam means.

48. The apparatus of claim 40 wherein said neck seal means has a generally V-shaped configuration, with one leg of the V crossing the neck axis and the other leg of the V extending adjacent said at least one valve film edge.

49. The apparatus of claim 48 wherein the other leg of the V is located adjacent the entrance opening of the passageway.

50. The apparatus of claim 40 wherein said neck seal means comprises at least one neck seam extending across the film strips to the at least one side edges thereof.

51. The apparatus of claim 40 wherein said neck seal means comprises a plurality of spaced, generally parallel neck seams crossing the neck axis.

52. The apparatus of claim 40 wherein the at least one side edge of the valve film strips is interrupted by the corner of the peripheral seam means.

53. The apparatus of claim 40 wherein the at least one side edge of the valve film strips extends through the corner of the peripheral seam means.

54. The apparatus of claim 40 wherein the at least one side edge of the valve film strips is spaced from the corner of the peripheral seam means.

* * * * *

UNITED STATES PATENT AND TRADEMARK OFFICE
CERTIFICATE OF CORRECTION

PATENT NO. : 5,248,275   Page 1 of 2
DATED : September 28, 1993
INVENTOR(S) : McGrath et al.

It is certified that error appears in the above-indentified patent and that said Letters Patent is hereby corrected as shown below:

Column 1, line 31, change "moving" to --slowing--.
Column 2, line 35, change "seas" to --seam--.
Column 2, line 36, change "an" to --as--.
Column 4, line 41, after "free" change "and" to --end--.
Column 5, line 8, change "an" to --as--.
Column 5, line 33, change "seas" to --seam--.
Column 5, line 62, after "that" change "and" to --end--.
Column 6, line 29, change "16,," to --16,--.
Column 6, line 32, change "Bean 36" to --seam 36--.
Column 7, line 2, change "portion" to --portions--.
Column 7, line 9, change "One and" to --One end--.
Column 7, line 12, change "seas" to --seam--.
Column 9, line 7, after "valve" insert --film--.

UNITED STATES PATENT AND TRADEMARK OFFICE
CERTIFICATE OF CORRECTION

PATENT NO. : 5,248,275
DATED : September 28, 1993
INVENTOR(S) : McGrath et al.

It is certified that error appears in the above-indentified patent and that said Letters Patent is hereby corrected as shown below:

IN THE CLAIMS:

Claim 31. Column 12, line 6, change "aid e" to --side--.
Claim 31. Column 12, line 14, change "seas" to --seam--.
Claim 31. Column 12, line 15, change "seas" to --seam--.
Claim 47. Column 14, line 2, after "spaced" change the period to a comma.

Signed and Sealed this

Eleventh Day of October, 1994

Attest:

BRUCE LEHMAN

*Attesting Officer*  *Commissioner of Patents and Trademarks*